United States Patent Office 3,846,196

Patented Nov. 5, 1974

3,846,196

TECHNIQUE FOR SELECTIVE ETCHING OF GOLD AND ETCHANT THEREFOR

Donald Morley MacArthur, Berkeley Heights, and Peter Kenny Skurkiss, Bloomfield, N.J., assignors to Bell Telephone Laboratories, Incorporated, Murray Hill, N.J.

No Drawing. Original application Sept. 1, 1972, Ser. No. 285,875, now Patent No. 3,816,317. Divided and this application Mar. 14, 1974, Ser. No. 451,014

Int. Cl. C23f *1/02*

U.S. Cl. 156—8 4 Claims

ABSTRACT OF THE DISCLOSURE

A technique for patterning of gold in the presence of palladium on integrated and thin film circuits involves the use of a novel selective etchant for gold comprising an alkaline solution of a ferricyanide salt and a cyanide salt.

The application is a division of application Ser. No. 285,875, filed Sept. 1, 1972, now Pat. No. 3,816,317.

This invention relates to a technique for selectively etching gold and to a novel etchant therefor. More particularly, the present invention relates to a technique for selectively etching gold in the presence of palladium with a novel chemical etchant.

In recent years, miniaturization of components and circuitry has become a major development activity in the electronics industry, so creating a need for precise and accurate techniques for fabricating integrated and thin film circuitry. The increasing popularity of titanium-palladium-gold metallization in such circuitry has focused interest upon pattern delineation techniques, particularly etchants utilized therefor.

Heretofore, aqua regia or a potassium iodide-iodine etchant has been utilized for such purposes. Unfortunately, each of these etchants attacks both gold and palladium, the former at a greater rate than the latter, so resulting in the undercutting of gold at photoresist interfaces. Accordingly, workers in the art have focused their interest upon the development of a selective chemical etchant for gold which is substantially inert with respect to palladium.

In accordance with the present invention, this end has been attained by the discovery of a novel etchant comprising an alkaline solution having a pH greater than 10 comprising a mixture of a ferricyanide solution and a cyanide solution in specific concentrations.

The etching procedure described herein is conducted with an alkaline solution comprising a mixture of a ferricyanide solution in which the ferricyanide is selected from among ammonium, sodium and potassium ferricyanide, and a cyanide solution in which the cyanide is selected from among ammonium, sodium and potassium cyanide. The concentration of the ferricyanide compound may range from 0.01 to 1 molar, the upper limit being dictated by the solubility limit of the material in the alkaline salt solution. The lower limit of 0.01 molar is dictated solely by practical considerations relating to etch rate. The concentration of cyanide is limited to concentrations within the range of 0.01 to 0.5 molar. Studies have revealed that the use of concentrations less than 0.01 molar do not provide sufficient cyanide to dissolve the gold. The upper limit of 0.5 molar is dictated by toxicity considerations. As noted, the pH of the etchant must be greater than 10. The use of solutions having a pH less than this value results in hydrolysis of the cyanide salt and emission of toxic cyanide gas. The desired pH may be readily attained by the use of any strong base such as potassium hydroxide, sodium hydroxide and the like.

The novel etchant described herein is prepared by admixing a cyanide solution and a ferricyanide solution just prior to etching. A cyanide solution having a molarity ranging from 0.01 to 0.5 comprising potassium, sodium or ammonium cyanide in a strong base is initially prepared. Following, a ferricyanide solution comprising potassium, sodium or ammonium ferricyanide having a molarity ranging from 0.01 to 1 is prepared. Then, the two solutions are mixed to form the novel etchant. Since the etching rate of the mixed solutions decreases by a factor of about one-half at room temperature over a 24-hour period, etching should be effected promptly after mixing the two solutions. Etching may then be conducted at temperatures ranging from room temperature to about 50° C., the higher temperatures being feasible for thicker films of the order of 12 microns and up.

Examples of the present invention are set forth below. The examples are intended to be illustrative only and it is to be appreciated that the methods described may be varied by one skilled in the art without departing from the spirit and scope of the invention.

A silicon slice having a thermally grown silicon dioxide insulating film 3000 A. in thickness was employed as a substrate member. Deposited upon the silicon substrate was a 1000 A. thick layer of titanium, a 1000 A. thick layer of palladium and a 1000 A. thick layer of gold. The substrate was initially patterned with a test mask using a commercially available negative photoresist. The procedure was repeated using a commercially available positive photoresist. The gold was etched in accordance with the invention utilizing an alkaline solution of 0.2 molar potassium ferricyanide admixed with 0.2 molar potassium cyanide in 0.1 molar potassium hydroxide. Studies of the resultant pattern revealed that it was residue free and evidenced excellent resolution of 10 micron lines with 10 micron spacings. The photoresist was removed and the gold pattern served as the mask for subsequent etching. The palladium was next etched with a mild copper chloride spray etch and the titanium etched by a 5 second immersion in a 48 percent $HBF_4$ solution. Excellent resolution of the gold pattern was retained throughout the subsequent etching steps.

Another example illustrates the use of this selective gold etch in a processing sequence where electroless gold was used for deposition of the gold film. The procedure described above was repeated with the omission of the gold film. The substrate was initially patterned with a beam lead test mask using a commercially available positive photoresist. The palladium and titanium were etched as before and the photoresist removed with acetone. Then, the slice was immersed in an electroless gold bath at 75° for 15 minutes, gold being deposited on and between the pattern lines during this period. Complete removal of gold was then effected in accordance with the invention utilizing the gold etching solution previously described. The etching was conducted at room temperature. The etched slice was then reimmersed in the electroless gold bath for 15 minutes and gold plated only upon the pattern lines. Following the etching and plating, the slice was studied and it was observed that no etching of palladium occurred during the processing sequence.

In a further example of the use of this selective gold etch in a process utilizing the electroless gold deposition, the procedure described above was followed with the omission of the first electroless gold deposition. In this example, the electroless gold is deposited only on the palladium pattern and not in the region between patterns.

What is claimed is:

1. A technique for the selective etching of gold in the presence of palladium which comprises immersing a structure including gold and palladium patterned with a resist in an etchant solution having a pH greater than 10 comprising a ferricyanide solution having a molarity within the range of 0.01 to 1 and a cyanide solution in a strong base having a molarity within the range of 0.01 to 0.5.

2. Technique in accordance with claim 1 wherein said ferricyanide is selected from the group consisting of potassium, sodium and ammonium ferricyanide and said cyanide is selected from the group consisting of potassium, sodium and ammonium cyanide.

3. Technique in accordance with claim 2 wherein the ferricyanide is potassium ferricyanide.

4. Technique in accordance with claim 2 wherein the cyanide salt is potassium cyanide.

References Cited

UNITED STATES PATENTS

| | | | |
|---|---|---|---|
| 3,482,975 | 12/1969 | Schaefer | 96—36.2 X |
| 3,728,176 | 4/1973 | Osborne et al. | 156—18 X |

OTHER REFERENCES

Metal Finishing, Pickling and Acid Dipping by Nathaniel Hall, Jan. 22, 1970, p. 215.

WILLIAM A. POWELL, Primary Examiner

U.S. Cl. X.R.

156—18; 252—79.5